United States Patent [19]

Ikegami et al.

[11] 3,883,684

[45] May 13, 1975

[54] SYSTEM FOR RECORDING AN INSTANTANEOUS CONFIGURATION OF MOVING BODIES

[75] Inventors: Yoshizo Ikegami, Amagasaki; Kenzo Yamanouchi, Kobey, both of Japan

[73] Assignee: Konan Camera Research Institute, Japan

[22] Filed: Apr. 6, 1973

[21] Appl. No.: 348,602

[30] Foreign Application Priority Data

Apr. 10, 1972 Japan ................................ 47-36336

[52] U.S. Cl. ............................ 178/6.8;178/DIG. 1; 178/DIG. 36; 340/38 P; 356/28

[51] Int. Cl. ............................................ H04n 7/18

[58] Field of Search............ 178/DIG. 1, DIG. 36, 6, 178/6.8, 7.1, 7.2; 340/38 P; 356/28

[56] References Cited

UNITED STATES PATENTS

| | | | |
|---|---|---|---|
| 3,678,189 | 7/1972 | Oswald | 178/DIG. 1 |
| 3,685,012 | 8/1972 | Case et al. | 178/DIG. 1 |

*Primary Examiner*—Robert L. Richardson

*Attorney, Agent, or Firm*—Craig & Antonelli

[57] ABSTRACT

A system for recording an instantaneous configuration of moving bodies wherein a television camera tube scans a line covering the location of moving bodies, a memory tube received video signals of the camera tube produces a striated photo-images on a photosensitive paper, and the paper is moved at the constant speed in the direction approximately perpendicular to the striated photo-images and is developed after receiving the striated photo-images thereby to obtain the configuration of said bodies.

11 Claims, 6 Drawing Figures

SYSTEM FOR RECORDING AN INSTANTANEOUS CONFIGURATION OF MOVING BODIES

Figure 1:
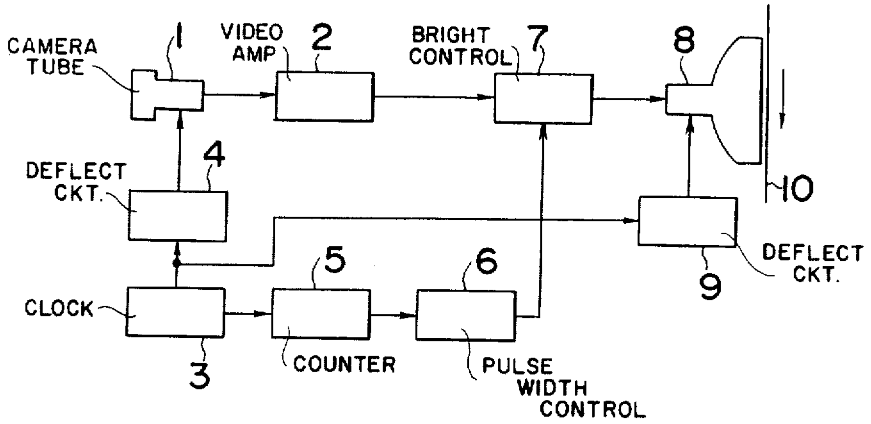

The present invention relates to a system for photographing and immediately obtaining a record of moving bodies, whereby the configuration of said bodies at a particular instant can be rapidly ascertained.

The system for recording an instantaneous configuration of moving bodies according to the present invention has various fields of application, for example, effectively utilizable in detecting for cracks of moving materials, observing the movement of living things and the like. However, the recording system herein disclosed as preferred embodiments thereof is particularly advantageous for use in ascertaining the order of entrants in a race meeting. In view of this, description of the present invention will be made in connection with the recording system applied in a race meeting.

In order to determine accurately the relative positions of entrants in a race at any point during the race, it is known to provide means for photographing and producing a record of the configuration of all or of certain of the entrants at a particular instant. Such means are extensively used in horse-, car-, or foot-racing competitions, the instant for photographing and producing a record being commonly when the leading entrants cross the finishing line, the object being to eliminate as far as possible human errors in assessing the order of winners. Such conventional means generally comprise a camera which is situated at some height above the entrants and records the whole race from start to finish, or which is electronically activated by a device which is itself activated by an object, in this case an entrant, car, horse or human being, passing a selected point, such a camera hence deriving its popular name of 'photo-finish camera' or similar appellations; the prints of the photographs, that is the records, of the race are marked with evenly spaced, parallel white lines thereon, and thus by examination of the positions of different entrants relative to these white lines on a photograph it is possible to determine the order of entrants and also the advance in time of one entrant over another at the time of the photograph. Thus far, conventional means achieve their object and are extremely useful in assisting race officials in determining the order of entrants at the start, finish or other point in a race.

However, such conventional means have certain inherent drawbacks. One disadvantage is that the film with which the above described photographs are taken has to be developed in the same manner as noramal camera film, and this takes time; another disadvantage is that the camera is not normally situated adjacent to the racing officials who must examine the records produced, and it is therefore necessary to transfer the records to the officials, and this also takes time; a further disadvantage concerns the photograph prints themselves, and is that the above-discribed white lines are imparted thereto by a complex mechanical means which is subject to breakdown and can be the cause of further delay. It will be readily understood that management of a race meeting is considerably hampered, since these various delays accumulate from one race to the next, and it has long been desired to obtain a means for assisting race officials in judging competitions without incurring the disadvantages inherent in conventional devices.

Accordingly, an essential object of the present invention is to provide an improve system for photographing and immediately obtaining a record of moving bodies, whereby the configuration of said bodies at a particular instant can be rapidly ascertained with substantial elimination of the above-mentioned disadvantages inherent in the conventional recording means of similar kind.

Another object of the present invention is to provide the improved system of the type above referred to in which one or more objects moving in the same direction are linearly scanned, video signals corresponding to images received at the scanning means are applied to a photosensitive fibre (photo-fibre) memory tube or electron memory tube to obtain reproduction of said images on a recording material which is moved perpendicularly, or approximately perpendicularly, past said memory tube, said system being susceptible of being employed in exactly the same situations as conventional methods and apparatus but without incurring the disadvantages inhereint in methods and apparatus employed hitherto.

A further object of the present invention is to provide the improved system of the tube above referred to wherein means is provided for producing vertical lines on the above-described reproduced images to facilitate assessment of configurations of entrants at the start or finish of a race, or of similar situations.

A still further object of the present invention is to provide the improved system of the type above referred to wherein means is provided for increasing the breadth of the above-described vertical lines on images stepwise to facilitate assessment of configurations of entrants at the start or finish of a race, or of similar situations.

According to an essential embodiment of the present invention there is provided a system for obtaining a record of the configuration at a required location of bodies moving in the same general direction wherein a fixed camera tube or similar means constantly scans a line covering a location at which it is desired to obtain a record, video signals produced by said camera tube are transferred to and synchronously converted to photo-pulses by a video signal memory means associated with a recording means, and said video signal recording means photo-pulses are transferred to a recording material which is approximately perpendicular to the long axis of and in motion relative to said recording means thereby to produce on the surface of said recording material a photo-image corresponding to the scene scanned by said camera tube.

The recording system of the principal construction as hereinbefore described has an essential advantages in that a time-consumed development of the camera film which is inherent in the conventional means of this kind can be substantially eliminated with simplified mechanisms. Accordingly, it is clear instantaneous photo-images of moving bodies can be obtained thereby permitting the configuration of said bodies to be rapidly ascertained at a particular instant.

Figure 2:
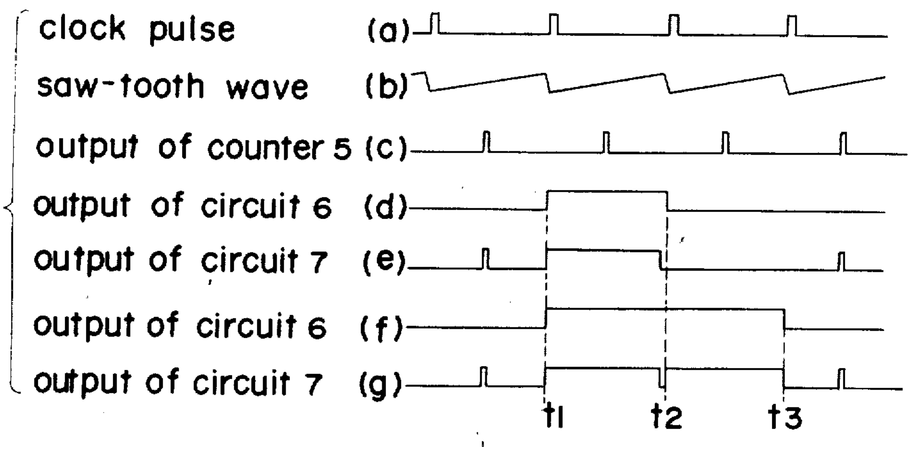
Figure 3:
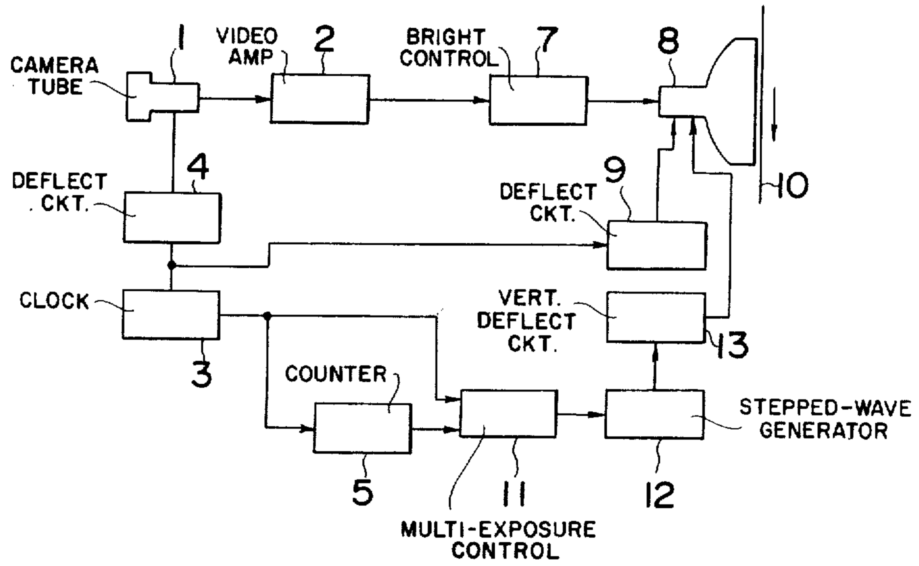
Figure 4:
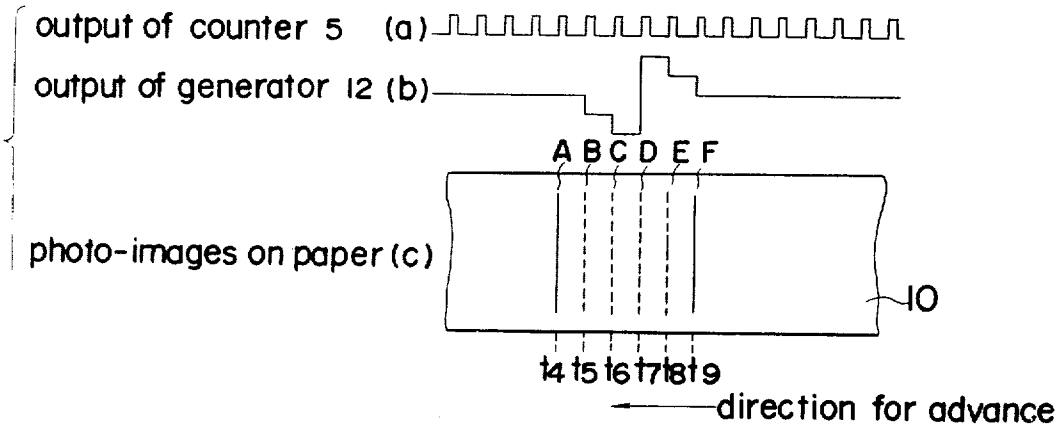
Figure 5:
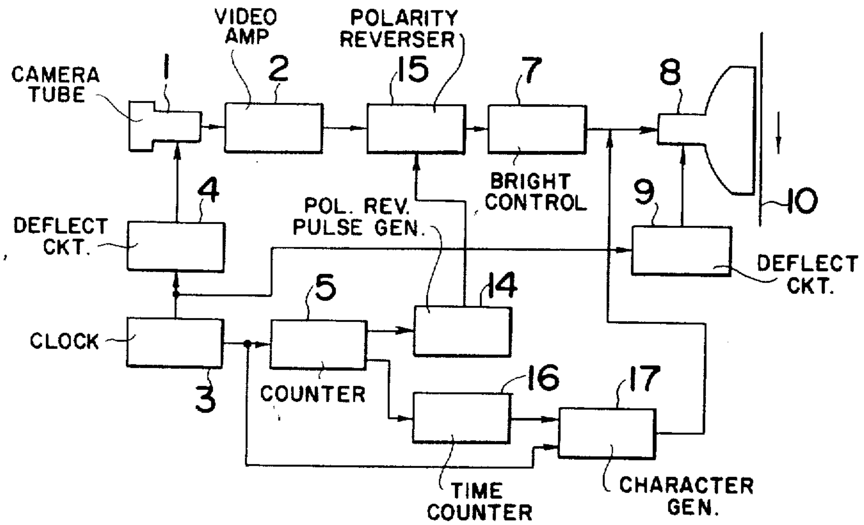
Figure 6:
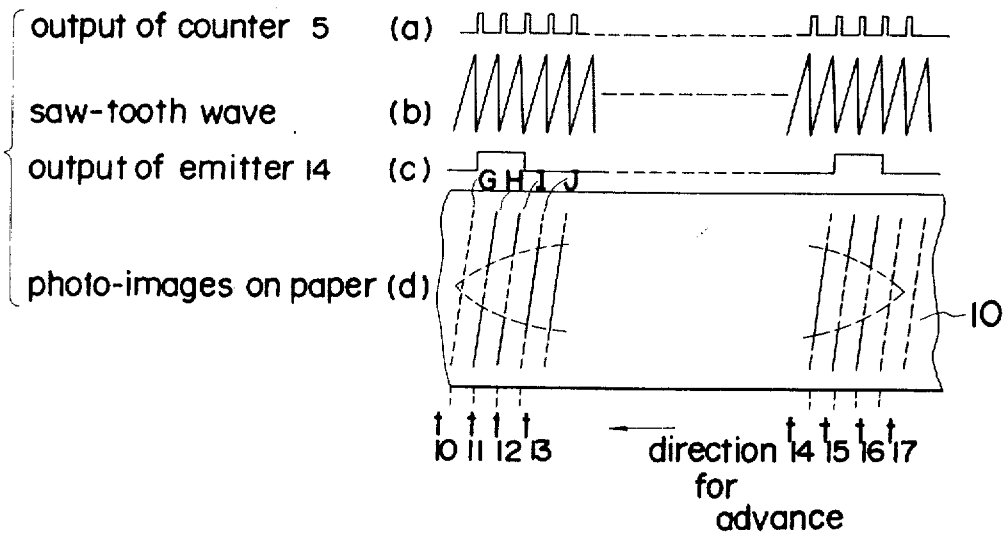

The present invention will be hereinafter fully described in conjunction with various preferred embodiments thereof with reference to the accompanying drawings, in which;

FIG. 1 is a block schematic diagram of one embodiment of the present invention,

FIG. 2, (a) to (g), shows waveforms obtained in different elements of the embodiment of FIG. 1, FIG. 3 is a block schematic diagram of another embodiment of the invention, FIG. 4, (a) to (c), shows waveforms and vertical lines on a recording material as obtained in the embodiment of FIG. 3, FIG. 5 is a block schematic diagram of a further embodiment of the invention, and FIG. 6 shows waveforms and a record with vertical lines as obtained in the embodiment of FIG. 5.

Before describing the specific embodiments of the present invention, it is to be noted that like parts are designated by like reference numerals throughout the several views of the accompanying drawings.

The apparatus of the invention, as illustrated in FIG. 1, comprises essentially a camera tube 1, a video amplifier circuit 2, a clock pulse emitter circuit 3, a 1st deflection circuit 4, a counter 5, a pulse width control circuit 6, a brightness control circuit 7, a photo-fibre memory tube 8, a second deflection circuit 9, and a supply of photo-recording paper 10. The camera tube 1 is a linear scanner type of conventional design which has a scanning range at least equal to the length of the line covered by entrants in a race at a point in the race at which it is desired to obtain a record of the positions of the entrants relative to one another, for example at the start or finish of the race. The video amplifier circuit 2 amplifies the output of the camera tube 1. The clock pulse emitter circuit 3 provides a clock pulse of, for example, 10KHz (as shown in FIG. 2(a)), which is supplied as an input to the 1st deflection circuit 4, which in response produces a saw-tooth wave output (FIG. 2(b)), which is applied to a deflection coil of the camera tube 1. In this manner, although the sweep of the camera tube 1 electron beam is only linear, the breadth of sweep thereof, that is the scanning line width can be adjusted to any value desired by varying the saw-tooth wave controlling the camera tube 1 deflection coil. The counter 5 counts the clock pulses emitted by the clock pulse emitter circuit 3, and every time after a set number of pulses have been counted supplies an input to the pulse width control circuit 6, which produces an output of pulses whose widths have been amplified to a required value. The brightness control circuit 7 has two inputs; one input is provided by the output of the video amplifier circuit 2, and the other input is provided by the output of the pulse width control circuit 6. Thus, in the brightness control circuit 7, by means of the control signals supplied by the pulse width control circuit 6, it is possible to adjust video signals from the video amplifier circuit 2 in any manner required to vary brightness, for example, by adjusting minimum video pulse level to above the white level, or maximum video pulse level to above the black level. Output of the brightness control circuit 7 is therefore determined by the inputs from control circuit 6 and amplifier circuit 2, and this output is supplied as input to the photo-fibre memory tube 8 which has a photo-fibre plate positioned at its output end and which produces an electron beam which sweeps the photo-fibre plate linearly and lengthwise. The photo-fibre memory tube 8 is also equipped with a deflection coil on which is impressed a saw-tooth wave output from the 2nd deflection circuit 9; the 2nd deflection circuit 9 has the same structure as the 1st deflection circuit 4, and also receives the same input, that is clock pulses, as shown in FIG. 2(b), from the clock pulse emitter circuit 3. Having the same structure and receiving the same input, the 1st and 2nd deflection circuits 4 and 9 therefore produce the same saw-tooth wave output. In other words, since the deflection coils of both the camera tube 1 and the photo-fibre tube 8 simultaneously have impressed the same saw-tooth wave, the sweep of the electron beam of the photo-fibre memory tube 8 is synchronized with that of the camera tube 1 electron beam. The photosensitive paper 10 is moved by and approximately parallel to the long axis of the photo-fibre plate at the end of the photo-fibre memory tube 8. Commercial quick industrial paper or similar materials which require only seconds for developing can be used as the photosensitive-paper which means that photo-records are obtained rapidly, and economically. The means for supplying and moving the photosensitive paper 10 can be any conventional means, for example a drum and rollers, and the paper is moved past the photo-fibre plate 8*a* at a suitable constant speed for receiving an impression (e.g. 20cm/s). After the paper 10 has been exposed to the memory tube 8 electron beam (which corresponds to the image scanned by the camera tube 1), it is transported to a developing unit, where the images received are immediately developed. All the above-described items of equipment in the system of the present invention are conventional, including the camera tube 1, photo-fibre memory tube 8, photosensitive recording paper 10, and the different circuits, and thus the production of the system presents no technical difficulties.

Below is given a description of the above-described equipment as used for recording at a race meeting.

The description takes as an example the recording of the finish of a car race, it being evident that exactly the same principles apply to recording any other part of the car race of any other part of any other kind of race, for example horse, or foot race, or of any other serial events.

As a first step a television unit A including the camera tube 1 is placed in the location of a conventionally used camera, adjacent to the finishing line also a video receiving unit B including the photo-fibre tube 8 is placed in the judges' box. Transmission between the television unit A and receiving unit B can be by cable or wireless irrespective of the distance. Scanning by the camera tube 1 is repetitive, linear and along a line parallel to the finishing line. Cars coming past the winning post represent moving objects for the camera tube 1, and therefore at the finish of a race camera tube 1 output varies from instant to instant. In the absence of any control signals from the pulse width amplification circuit to the brightness control circuit 7, video signals corresponding to the scene scanned by the camera tube 1 are amplified by the amplified circuit 2, passed unmodified through the brightness control circuit 7 and applied to the photo-fibre memory tube 8. Acting through the fibre plate 8*a*, the video signals received at the memory tube 8 produce a striated photo-image on the photosensitive paper 10 which is moved step by step at every scanning of the camera tube 8. The paper 10 is moved past the end of the memory tube 8 and therefore successive photo-images of successive cars passing the location being scanned by the camera tube 1, that is the finishing line, are imparted to successive portions of the paper 10 at the direction opposite to moving direction of the paper, which thus provides a complete record of the finishing order at the end of a race after its spot development. Upon photographing all of cars by the television unit A at the finishing line, photo-images of all cars are reproduced on the photosensitive paper of the video receiving unit B, each of which is positioned different to the other in accordance with the time of car passing through the finishing line. Accordingly, the paper developed makes it possible to ascertain the relative position of cars in connection with the photo-images and the arrival time of cars corresponding to the speed of the paper. Next is given an explanation of the operation of the system of the invention in the same situation, but with the application of control signals from the pulse width control circuit 6 to the brightness control circuit 7.

To simplify the explanation, it is assumed that an output pulse of the same waveform is obtained from the counter 5 for each scan of the camera tube 1, as shown in FIG. 2(c). Each time the pulse width control circuit 6 receives an input from the counter 5, at a reference time or at set intervals after a reference time, the control circuit 6 produces an output of a pulse width which covers the time required for one complete saw-tooth wave produced for sweep control, the control circuit 6 output pulse lasting, for example, from time $t_1$, to time $t_2$, as shown in FIG. 2(d). This control pulse from the pulse width control circuit 6 is supplied as input to the brightness control circuit 7, and enables the circuit 7 to produce a uniform output, as shown in FIG. 2(e), regardless of the level or waveform of input video signals, that is, whatever the scene being scanned by the camera tube 1; the duration of this uniform output from the brightness control circuit 7 is that of the voltage rise time of one saw-tooth wave, that is, from time $t_1$ to just before $t_2$. The circuit 7 uniform level pulse is supplied to the memory tube 8, and a portion of uniform brightness is produced on the photo-recording paper 10. This portion of uniform brightness on the paper 10 can be white or black (or, of course, if required, half-tone), and since the duration of the uniform output from the brightness control circuit 7 is very short, the corresponding portion on the paper 10 appears as a vertical line. In other words, timed input to the pulse width controller 6 produces timed input from the circuit 6 to the brightness control circuit 7, which produces a timed uniform brightness output, and therefore the spaces between the vertical lines of uniform brightness produced on the paper 10 correspond to regular intervals of time.

If a uniform brightness output lasting for the duration of only one sawtooth wave produces a vertical line that is too thin, the pulse width control output from the pulse width control circuit 6 can be made to last from time $t_1$ to time $t_3$, that is for two sawtooth wave cycles, as shown in FIGS. 2(f) and (g), in which case the thickness of the vertical lines is doubled. The pulse width control circuit is not, of course, limited to producing output lasting on sawtooth wave cycle, or two, but its output can be adjusted to last for any number of sawtooth wave cycles required, and hence the thickness of the vertical lines produced on the paper 10 can be increased stepwise. In all cases, however, whatever the thickness of the vertical lines, their spacing on the paper 10 is regular and corresponds to intervals of time, since the pulse width control circuit 6 output, whatever its duration, is produced at timed intervals. These vertical lines are imposed on the photo-image of the scene scanned by the camera tube 1, and make it possible to ascertain the times between cars as well as their order.

The system of the present invention has the further advantage over conventional systems that in photographing scenes in which there is poor contrast it is possible to obtain better contrast between objects photographed, that is, entrants in a race, and the vertical line produced on the print providing a record of a point in the race. For example, if the background to a scene photographed is snow-covered, it is extremely difficult, if not impossible, to distinguish the white time-lines that are produced on a conventional photo-record from the background; interpretation of the record is rendered even more difficult, if, as is not unusual, the winning cars also are white. With the system of the present invention this problem is solved simply and effectively by reversing the polarity either of the signals producing vertical lines on the paper 10 or of the signals producing a photo-image. That is, video signals are passed normally from the camera tube 1 to the memory tube 8, where as the polarity of the timed uniform brightness pulse output from the brightness control circuit 7 is reversed at the location of the vertical line to be produced on the paper for providing a record of a point in a race, which results in black lines in the photo-record on the paper 10. Contrariwise, the polarity of the output of the brightness control circuit 7 can be left unchanged, and the polarity of the video signals reversed, in which case the photo-record contains white lines against a darker background. In either case, the contrast of the vertical lines and the photographed scene is made stronger, and the task of examining photo-records of close finishes is greatly facilitated.

In another embodiment of this invention, shown in FIG. 3, vertical lines on the paper 10 are produced by a different means, as explained below. It is to be noted that like elements of the system in FIGS. 1 and 3 designate like numbers and eliminate, for the sake of brevity, the detailed explanation thereof.

There is known in FIG. 3 the basic system of the first embodiment to which is further connnected a multi-exposure control circuit 11, a stepped wave generator 12, and a vertical deflection circuit 13. The multi-exposure control circuit 11 receives a continuous input from the clock pulse emitter 3 and an input at timed intervals from the counter 5, each time a set number of pulses has been couned thereby, and when the two inputs coincide, the control circuit 11 produces an output consisting of a train of pulses each having a duration equal to a scan-control sawtooth wave cycle. In the explanation below the duration and timing of the multi-exposure control circuit 11 output are taken as being from time $t_5$ to time $t_8$, it being understood that both the duration and the timing of this output can be set as required. The control circuit 11 output is supplied to the stepped wave generator 12, which in response produces an output which consists of pulses with alternately lowered and raised voltage levels, as shown in FIG. 4(b), and which is supplied to the vertical deflection circuit 13. The vertical deflection circuit 13 produces a corresponding output which is imposed on the vertical deflection coil of the photosensitive fibre memory tube 8. The changes of voltages levels of the pulses transferred from the stepped wave generator 12 cause the scan lines for exposure scanning of the photo-recording paper 10 to be shifted one or two pitches forward or back with respect to the direction of travel of the paper 10. In this embodiment, lowering of pulse level causes a scan line to be shifted forward relative to the direction of paper 10 travel, and raising pulse level causes a shift back. Some scanning lines being shifted back and some forward, the net result is a blank on the recording paper 10; the width of the blank depends on the duration of the stepped wave generator 12 output, and this being short, the blank appears as a vertical line on the paper 10. A more detailed explanation of this operation follows below.

The counter 5 is set to produce an output each time a certain number (e.g., 10KHz) of clock pulses have been counted. This output is supplied to the multi-exposure control circuit 11, which is also receiving input from the clock pulse emitter 3, and which provides a timed input lasting, for example, from time $t_5$ to time $t_8$, to the stepped wave generator 12. The stepped wave generator 12 output in response to this input is as shown in FIG. 4(*b*): the level of the 1st output pulse is lowered one step (i.e., by a set amount) from the level of the initial input pulse the level of the second output pulse is lowered a further step, the value of voltage of the 3rd output pulse is unchanged but its polarity is reversed, which brings its level to two steps above that of the initial input pulse, the level of the fourth output pulse is lowered one step from that of the third pulse, and the fifth output pulse is stepped down once again, bringing it to the level of the initial input pulse. Prior to and during this output, the photo-fibre memory tube 8 is scanning the photo-recording paper 10 moving past the fibre plate 8*a*; scanning of the paper 10 by the memory tube 8 is synchronized with the scanning of the scene by the camera tube 1 by the sawtooth wave outputs from the second and first deflection circuits 9 and 4, respectively, and in the absence of any output from the circuit 12 and 13 impressed on the vertical deflection coil of the memory tube 8, successive portions of the paper 10, corresponding to successive memory tube 8 scanning lines, are exposed, to produce a striated photo-image of the scene to be recorded. In this example, therefore, as illustrated in FIG. 4(*c*), at time $t_4$ the paper 10 is exposed normally and one segment A of a composite striated photo-image is produced thereon. But at time $t_5$ the memory tube 8 vertical deflection coil has impressed a low level input pulse coming from the stepped wave generator 12, the amount that the input pulse is stepped down being such that the photo-image segment that would be produced normally (i.e., in the absence of stepped wave generator 12 output) on section B of the paper 10 by the $t_5$ scanning line of the memory tube 8 is moved forward one scanning line interval with respect to the direction of travel of the paper 10; but in the time from $t_4$ to $t_5$ the photo-image segment produced by the $t_4$ scanning line on the paper 10 section A has moved forward only one scanning line interval, and therefore the $t_5$ photo-image segment is superimposed on the $t_4$ photo-image segment on section A of the paper 10, and the paper 10 section B is left blank. Similarly, at time $t_6$ a pulse that has been stepped down twice is supplied to the memory tube 8 vertical deflection coil and causes the photo-image segment that the $t_5$ scanning line would normally produce on the paper 10 section C to be moved forward two scanning line intervals, and be superimposed on the $t_4$ scanning line photo-image segment on the paper 10 section A, which has moved forward two scanning line intervals in the time from $t_4$ to $t_6$. In other words, the paper 10 section A is triple-exposed and has superimposed the $t_4$, $t_5$, $t_6$ photo-image segments, and the paper 10 sections B, C are unexposed and therefore blank. At time $t_7$ the polarity of the stepped wave generator 12 input pulse to the memory tube 8 vertical deflection coil is reversed, that is it is stepped up twice and has the effect of moving the photo-image segment produced by the $t_7$ scanning line two scanning line intervals back with respect to the direction of travel of the paper 10; at time $t_8$ the photo-image segment produced by the $t_8$ scanning line is moved one scanning line interval back, since the pulse supplied to the memory tube 8 vertical deflection coil is stepped up once; and the $t_9$ photo-image segment is produced normally on the paper 10, since at time $t_9$ there is no input from the stepped wave generator 12 through the vertical deflection circuit 13 to the memory tube 8 vertical deflection coil. Therefore the $t_7$ and *t8* photo-image segments that would normally be produced on paper 10 sections D and E respectively are superimposed on the $t_9$ photo-image segment produced on section F of the paper 10, since the paper 10 section F is two scanning line intervals after the paper 10 section D and one scanning line interval after section E; hence, the paper 10 section F, similarly to section A, is triple-exposed, and the sections D and E are blank. The net result is that from times $t_5$ to $t_8$ a blank, which appears as a vertical line, is produced on the paper 10. The vertical lines thus produced are white, but can easily be produced as black lines, for example by reversing the polarities of the pulses applied to the memory tube 8 vertical deflection coil, and in both cases the vertical lines can be as thin or as thick as required by shortening or lengthening the length of time the multi-exposure control circuit 11 produces a controlling output that is supplied to the stepped wave generator 12. The method of producing vertical lines on the paper 10 in the second embodiment is a further improvement of the method of the first embodiment in that the edges of the lines can be formed by any number of superimposed exposure, and are thus sharply delineated, which further facilitates the task of interpreting photo-finish records.

In another embodiment of the invention, the polarities of alternate video signals from the camera tube 1 are reversed for a certain time, to reverse the blank and white portions of the photo-image produced on the photo-recording paper 10, to further improve the distinction between the photo-images of objects and the time-lines formed on the paper 10. This embodiment is especially suitable for the recording of very close finishes and a fuller explanation thereof is given below and taken in reference to FIG. 5, wherein like numbers refer to the same elements as like numbers in FIGS. 1 and 3.

In addition to the elements of the first embodiment, there is shown in FIG. 5 a polarity reversal pulse emitter 14, a polarity reversal circuit 15, a time counter 16 and a character pattern emitter 17. Input to the polarity reversal pulse emitter 14 is from the counter 5, and when an input is received, the pulse emitter 14 produces a control output which is supplied to the polarity reversal circuit 15. The polarity reversal circuit 15 also receives an input from the video amplifier 2. In the absence of an input from the emitter 14, the polarity reversal circuit 15 passes the video signals unchanged to the brightness control circuit 7, from where they are supplied to the memory tube 8 to produce a normal photo-image on the paper 10; but when the polarity reversal circuit 15 receives a control input from the emitter 14, it reverses the polarities of video signal received from the video amplifier 2, and these polarity-reversed signals are forwarded to the memory tube 8, and produce a photo-image on the paper 10 in which the portions that would normally be black are white, and the portions that would normally be white are black. The time counter 16 starts counting time upon receipt of input from the counter 5, and its output is supplied to the character pattern emitter 17, which also receives an input from the clock pulse emitter 3, and which in response to an input from the time counter 16 supplies the photo-fibre memory tube 8 with input pulses for the production of numerals indicating time on the paper 10.

An explanation of the operation of the above-recited elements is given below, taking as an example the case where, as shown in FIG. 6(c), the polarity reversal pulse emitter 14 supplies control pulses to the polarity reversal circuit 15 in the periods time $t_{11}$ to time $t_{13}$ and time $t_{15}$ to time $t_{17}$, it being understood that the counter 5 can be set to cause the circuit 14 to produce output for any other periods or at any other times. At time $t_{10}$ there is no control input to the polarity reversal circuit 15 from the pulse emitter 14, and so camera tube video signal output is passed normally through to the memory tube 8 to produce a normal striated photo-image on the paper 10, as on the paper 10 section 9 shown in FIG. 6(d). At time $t_{11}$ a photo-image corresponding to the scene scanned by the camera tube 1 is imparted to the next paper 10 section, section H. At time $t_{11}$, however, the polarity reversal circuit 15 receives input from the polarity reversal pulse emitter 14 as well as from the video amplifier 2 and therefore the polarities of video signals from the camera tube 1 are reversed, and black and white are reversed in the corresponding photo-image produce on section H of the paper 10. There is an input to the polarity reversal circuit 15 from the emitter 14 in time $t_{12}$, also, and so the $t_{12}$ photo-image segment produced on the paper 10 section 1 also has black and white reversed. At time $t_{13}$ there is no emitter 14 output and so the $t_{13}$ photo-image segment produced on the paper 10 section J is normal, that is without colour reversal. Similarly, in the period from time $t_{14}$ to time $t_{17}$: there is no output from the emitter 14 to the polarity reversal circuit 15 at time $t_{14}$, there is output at time $t_{15}$, $t_{16}$, and again no output at time $t_{17}$, and so the $t_{14}$ photo-image segment is normal, the $t_{14}$, $t_{15}$ photo-image segments have black and white reversed, and the $t_{17}$ photo-image segment is again normal. In this embodiment, therefore, the polarities of video signals can be reversed for any set period, to produce a section of any breadth in a photo-image wherein black and white are reversed, the set period lasting at least the time required for one scan, and the breadth of the colour-reversed section of the photo-image being equal to at least one scanning line. This embodiment thus overcomes difficulties that are unavoidable with conventional systems; for example, in examining a photo-finish record produced by a conventional system, it can be a considerable problem to ascertain the exact position of the very front of a white car with relation to the white time lines, where as the position would become immediately apparent in a photo-finish record produced by this embodiment of the invention.

Also in this embodiment, in order to stick numbers indicating times at one end of the vertical lines on a record, one end of the line covered by the scanning lines of one surface of the camera tube 1 is optically blocked, and corresponding portions of the photo-fibre memory tube 8 receive intensity modulation signals from the character pattern emitter 17, which emits signals at the times when the vertical lines are formed and upon receiving input from the time counter 16 (which is controlled by the counter 5) thus causing successive numbers starting from a reference time to be produced on successive vertical lines.

As is clear from the above descriptions the system of the invention fulfils the same functions as conventional systems, but with many added advantages. The system of the invention makes it possible to obtain instantaneous photo-images in which definition is much greater than is possible with conventional systems. Also, the system of the invention can be fully automatic, or it can be provided with various manual controls for adjustments as considered convenient by those responsible for the organization of a race meeting, or similar events. Also, transmission from the image receiving means to the image recording means is electrical, and therefore operation is faster and the elements of the system can be separate from one another and in any convenient locations. Also, in the invention, to facilitate examination of photo-records it is easily possible to vary the thickness of the time lines marked on photo-records. Also, commercial quick industrial paper or similar materials which require only seconds for developing can be used as the recording material, which means that photo-records are obtained rapidly, and economically. While offering a great improvement over conventional systems, the invention does not require any special circuitry or equipment, but uses only elements that are commercially available, and the system of the invention can simply and cheaply replace a conventional system as a means for obtaining photo-records at race meetings or similar events.

The descriptions of the embodiments above referred only to obtaining a record of the finish of a race, but the system of the invention can be used unmodified for obtaining records of any other point in a race, or of any other forward movement of one or more bodies, not necessarily rectilinear and not necessarily in a race; recording in this latter case for example, of a group of bodies moving forward in zig-zag formation, would by determining the general direction of forward movement and them scanning along a line approximately perpendicular to the forward direction.

The system as described above is, of course, susceptible of various modifications or adaptations as to equipment, material used, or layout, without in any way departing from the principles or spirit of the invention. For example, instead of obtaining photo-records of moving objects by means of a fixed camera, it is possible to scan still objects with a moving camera, in which case the spatial relationship between the still objects would be determined by the positions of their images on the photo-record and the tracking speed of the camera. Also, since the imparting of a photo-image requires essentially that there be relative movement between the photo-fibre memory tube and the photo-recording paper, instead of moving paper past a fixed memory tube it is possible to keep the paper still and move the memory tube past the paper, or move both memory tube and paper. Also, instead of using a photo-fibre memory tube it is of course possible to use an electrostatic memory tube, thin-wall memory tube or any other type of cathode-ray tube designed for the purpose of recording information received in the form of electrical signals on a recording material; the recording material itself can be quick industrial paper, quick copy material, or any other commercially available material.

In any way, such changes and modifications should be, unless otherwise they depart from the true scope and spirit of the present invention, construed as included therein.

What is claimed is:

1. A system for obtaining a record of the configuration at a required location of bodies moving in the same general direction, comprising fixed camera means for constantly scanning a line covering a location at which it is desired to obtain a record and for producing video output signals indicative thereof, video signal memory means responsive to said video output signals for synchronously converting said video output signals to photo-signals to be recorded, and recording material means movable in a predetermined direction relative to said video signal memory means, said recording material means being responsive to said photo-signals for producing on the surface thereof a photo-image corresponding to the scene scanned by said camera means, said video signal memory means including line means for producing on the photo-image on the surface of said recording material means lines extending transversely to the direction of movement thereof and being indicative of predetermined intervals of time.

2. A system according to claim 1, wherein said line means produces vertical lines on the photo-image on the surface of said recording material means.

3. A system according to claim 2, wherein said line means includes means for varying the brightness of said video output signals generated in accordance with at least one scanning line of said camera means.

4. A system according to claim 3, wherein said line means includes means for varying the brightness of said video signals generated in accordance with a varying number of scanning lines of said camera means in a step-wise manner so as to vary to thickness of said vertical lines on the photo-image on the surface of said recording material means.

5. A system according to claim 3, wherein said line means includes clock means providing an output to a deflection circuit of said camera means and said video signal memory means, said line means further including counter means for receiving an output of said clock means and providing an output in response to the output of said clock means, pulse width control means responsive to the output of said counter means for providing an output for varying the brightness of the video output signals.

6. A system according to claim 2, wherein said line means includes means for superimposing on same line of the photo-image on the surface of said recording material means video signals corresponding to at least two scanning lines of said camera means so as to produce said vertical lines.

7. A system according to claim 6, wherein said line means includes means for varying the number of video signals corresponding to scanning lines of said camera means which are superimposed on the same lines of the photo-image on the surface of said recording material means in a step-wise manner so as to vary the thickness of said vertical lines.

8. A system according to claim 6, wherein said lines means includes clock means providing an output to a deflection circuit of said camera means and a deflection circuit of said video signal memory means, said line means further including counter means receiving an output of said clock means and providing an output in accordance therewith, multi-exposure control circuit means receiving an output from said clock means and said counter means for providing an output in accordance therewith, step-wave generator means responsive to the output of said multi-exposure control circuit means for providing an output, and vertical deflection circuit means for controlling the vertical deflection of said video signal memory means in response to the output of said step-wave generator means.

9. A system according to claim 1, wherein said video signal memory means includes means for reversing the polarity of video output signals produced in correspondence to predetermined scanning lines of said camera means for a predetermined time so as to reverse the normal color photo-image produced on the surface of said recording material means for said predetermined period of time.

10. A system according to claim 9, wherein said polarity reversing means includes counter means responsive to an output from a clock means providing outputs to a deflection circuit of said camera tube means and a deflection circuit of said video signal memory means for providing an output to a polarity reversal pulse generator means, said polarity reversal pulse generator means providing an output to a polarity reversal circuit means receiving an input of said video output signals for reversing the polarity of said video output signals.

11. A system according to claim 10, wherein said video signal memory means further includes time counter means responsive to an output of said counter means for providing an output at predetermined intervals, character pattern generator means responsive to an output of said clock means and said time counter means for generating a character indicative of a predetermined time for recording on said recording material means.

* * * * *